(12) United States Patent
Wang (10) Patent No.: US 12,038,123 B2
(45) Date of Patent: Jul. 16, 2024

(54) OVERLAPPING SPLICEABLE DISPLAY APPARATUS INCLUDING ANGLE ADJUSTING STRUCTURE AND POSITION ADJUSTING STRUCTURE

(71) Applicant: BOE TECHNOLOGY GROUP CO., LTD., Beijing (CN)

(72) Inventor: Zifeng Wang, Beijing (CN)

(73) Assignee: BOE TECHNOLOGY GROUP CO., LTD., Beijing (CN)

( * ) Notice: Subject to any disclaimer, the term of this patent is extended or adjusted under 35 U.S.C. 154(b) by 22 days.

(21) Appl. No.: 17/915,576

(22) PCT Filed: Sep. 1, 2021

(86) PCT No.: PCT/CN2021/115890
§ 371 (c)(1),
(2) Date: Sep. 29, 2022

(87) PCT Pub. No.: WO2022/088943
PCT Pub. Date: May 5, 2022

(65) Prior Publication Data
US 2023/0131298 A1 Apr. 27, 2023

(30) Foreign Application Priority Data
Oct. 30, 2020 (CN) .......................... 202011193791.6

(51) Int. Cl.
*F16M 11/12* (2006.01)
*F16C 11/12* (2006.01)
*F16M 13/02* (2006.01)

(52) U.S. Cl.
CPC ........... *F16M 11/123* (2013.01); *F16C 11/12* (2013.01); *F16M 13/02* (2013.01)

(58) Field of Classification Search
CPC ......... F16M 11/23; F16M 11/12; F16M 13/02
See application file for complete search history.

(56) References Cited

U.S. PATENT DOCUMENTS 9,500,856 B2 * 11/2016 Yoshikawa ....... G02F 1/133305
9,638,905 B1 5/2017 Dai et al.
(Continued)

FOREIGN PATENT DOCUMENTS

CN 201107508 Y 8/2008
CN 101587670 A 11/2009
(Continued)

*Primary Examiner* — Anita M King
(74) *Attorney, Agent, or Firm* — HOUTTEMAN LAW LLC (57) ABSTRACT

The present disclosure provides an overlapping spliceable display apparatus including a fixing assembly on a back of a display module, for fixing the display module to a support, the fixing assembly includes: an angle adjusting structure, which is connected to the display module, for adjusting an angle of a display surface of the display module in a first plane perpendicular to the display surface; and a position adjusting structure, which is connected to the angle adjusting structure and the support, for adjusting positions of the display module in a first direction, a second direction and a third direction, wherein any two of the first direction, the second direction and the third direction are perpendicular to each other, the first direction and the second direction are each parallel to the first plane, and the third direction is perpendicular to the first plane.

14 Claims, 8 Drawing Sheets

(56) References Cited

U.S. PATENT DOCUMENTS

| | | | | |
|---|---|---|---|---|
| 10,203,727 | B2* | 2/2019 | Sun | G06F 1/1652 |
| 11,076,499 | B2* | 7/2021 | Jeon | H05K 5/0017 |
| 11,829,041 | B2* | 11/2023 | Zhou | G02F 1/1368 |
| 2020/0103068 | A1* | 4/2020 | Ahn | F16M 11/043 |
| 2022/0154873 | A1* | 5/2022 | Cao | F16M 11/04 |

FOREIGN PATENT DOCUMENTS

| | | | |
|---|---|---|---|
| CN | 101685217 A | | 3/2010 |
| CN | 105225614 A | | 1/2016 |
| CN | 205005151 U | | 1/2016 |
| CN | 205264273 U | | 5/2016 |
| CN | 105788464 A | | 7/2016 |
| CN | 105938686 A | | 9/2016 |
| CN | 209880031 U | | 12/2019 |
| CN | 110985858 A | | 4/2020 |
| CN | 110992824 A | | 4/2020 |
| CN | 111261042 A | | 6/2020 |
| CN | 210716702 U | | 6/2020 |
| CN | 210722220 U | | 6/2020 |
| CN | 115116346 A | * | 9/2022 |

* cited by examiner

OVERLAPPING SPLICEABLE DISPLAY APPARATUS INCLUDING ANGLE ADJUSTING STRUCTURE AND POSITION ADJUSTING STRUCTURE

CROSS-REFERENCE TO RELATED APPLICATION

This is a National Phase Application filed under 35 U.S.C. 371 as a national stage of PCT/CN2021/115890, filed on Sep. 1, 2021, an application claiming the benefit of Chinese Application No. 202011193791.6, filed on Oct. 30, 2020, the content of each of which is hereby incorporated by reference in its entirety.

TECHNICAL FIELD

The present disclosure relates to the technical field of display apparatus, and in particular to an overlapping spliceable display apparatus.

BACKGROUND

A display splicing screen is a super large display screen formed by splicing a plurality of vertically and horizontally arranged display modules. Since surrounding bezels of the display modules have a certain width, a seam between the display modules is large, which will directly affect a display effect of the splicing screen.

The display modules include flat display and curved display, but at present, there is no overlapping splicing adjustment apparatus that is common to display modules of flat display and curved display and can improve convenience and safety of overlapping splicing, and no overlapping spliceable display apparatus that is convenient and safe.

SUMMARY

The present disclosure aims to solve at least one of the technical problems that exist in the prior art, and provides a spliceable display apparatus which is applicable to the display modules of flat display and curved display and can improve the convenience and security of overlapping splicing.

In order to achieve the purpose of the present disclosure, it is provided an overlapping spliceable display apparatus including a display module, wherein the display module includes a display panel and a back plate unit on a back of the display panel, at least one side of the back plate unit is at inside of a side of the display panel corresponding to (parallel and close to) the side of the back plate unit, so as to form an overlapping splicing area at the back of the display panel and near an edge of the display panel, and the overlapping splicing area is for splicing with a bezel area on a front of another display panel by overlapping.

Alternatively, the overlapping spliceable display apparatus further includes a fixing assembly on a back of the display module, for fixing the display module to a support; wherein the fixing assembly includes an angle adjusting structure which is connected to the display module, for adjusting an angle of a display surface of the display module in a first plane perpendicular to the display surface; and the angle adjusting structure includes: a first fixing member connected to a position adjusting structure; and a rotating member, which is connected to the first fixing member and the display module, and configured to enable the display module to rotate relative to the first fixing member around a rotation axis perpendicular to the first plane.

Alternatively, the first fixing member includes a strip-shaped vertical hanging plate, a length direction of the strip-shaped vertical hanging plate and the first plane are perpendicular to each other; both ends of the strip-shaped vertical hanging plate are provided with a first parallel connecting plate, respectively, a second parallel connecting plate is provided on the back of the display module, the first parallel connecting plate and the second parallel connecting plate are arranged opposite to each other and are each parallel to the first plane, and the rotating member is connected between the first parallel connecting plate and the second parallel connecting plate.

Alternatively, the overlapping spliceable display apparatus includes a plurality of the first fixing members, wherein the plurality of the first fixing members are symmetrically distributed with respect to the back of the display module; the number of the rotating members is the same as that of the first fixing members, and the rotating members are connected to the first fixing members in a one-to-one correspondence (each of the rotating members is connected to one of the first fixing members, and each of the first fixing members is connected to one of the rotating members).

Alternatively, the rotating member includes a first rotary damper for fixing the display module in the first plane at any angle.

Alternatively, the fixing assembly includes the position adjusting structure; the position adjusting structure is connected to the angle adjusting structure and the support, for adjusting a position of the display module in a first direction, a second direction and a third direction, wherein any two of the first direction, the second direction and the third direction are perpendicular to each other, the first direction and the second direction are each parallel to the first plane, and the third direction is perpendicular to the first plane; the position adjusting structure includes: a second fixing member, which is connected to the angle adjusting structure, wherein the second fixing member is provided with a first connecting member, the support is provided with a second connecting member, and the first connecting member is connected to the second connecting member in a hanging mode; and a position adjusting component for adjusting a relative position between the first connecting member and the second connecting member in the first direction, the second direction and the third direction.

Alternatively, the position adjusting component includes three adjusting screws having axes parallel to the first direction, the second direction and the third direction, respectively, each of the three adjusting screws is in threaded connection with one of the first connecting member and the second connecting member and abuts against the other of the first connecting member and the second connecting member, so as to adjust a relative position between the first connecting member and the second connecting member by rotating the adjusting screw clockwise or counterclockwise.

Alternatively, the second fixing member includes: a rectangular frame, wherein four of the first connecting members are provided at four corners of the rectangular frame, respectively, the support is correspondingly provided with four of the second connecting members, and the first connecting members are connected to the second connecting members in a one-to-one correspondence (each of the first connecting members is connected to one of the second connecting members, and each of the second connecting members is connected to one of the first connecting members); the number of the position adjusting components is four, and the position adjusting components are, in a one-to-one correspondence, for adjusting relative positions between the first connecting members and the second connecting members corresponding to (attached to) the first connecting members in the first direction, the second direction and the third direction (each of the position adjusting components is for adjusting relative positions between one of the first connecting members and the second connecting member attached to this first connecting member in the first direction, the second direction and the third direction; and relative positions between each of the first connecting members and the second connecting member attached to this first connecting member in the first direction, the second direction and the third direction, are adjusted by one of the position adjusting components); and a fixing plate, which is stacked on the rectangular frame and on a side of the rectangular frame close to the display module, wherein the fixing plate is connected to the rectangular frame and the angle adjusting structure, and for installing a system box.

Alternatively, first parallel flangings are provided at upper and lower ends of the rectangular frame, respectively, and second parallel flangings are provided at upper and lower ends of the fixing plate, respectively, the first parallel flangings and the second parallel flangings are each parallel to the first plane; and each of the first parallel flangings is opposite to the second parallel flanging corresponding to (parallel to) the first parallel flanging, and a second rotary damper is between the first parallel flanging and the second parallel flanging to enable the fixing member to rotate around a rotation axis perpendicular to the first plane.

Alternatively, a first fastening member is in the second parallel flanging at the upper end of the fixing plate, and a second fastening member is correspondingly in the first parallel flanging at the lower end of the rectangular frame; a first arc-shaped hole centering on the rotation axis is in the first parallel flanging at the upper end of the rectangular frame, and a second arc-shaped hole centering on the rotation axis is correspondingly in the second parallel flanging at the lower end of the fixing plate; and a relative angle between the fixing member and the rectangular frame is locked by fixedly connecting the first fastening member to the first arc-shaped hole at different positions and fixedly connecting the second fastening member to the second arc-shaped hole at different positions.

Alternatively, a parallel adjusting structure is between the angle adjusting structure and the position adjusting structure, for adjusting a relative position between the angle adjusting structure and the position adjusting structure in the first direction.

Alternatively, the display module includes a display panel and a back plate unit on a back of the display panel, at least one side of the back plate unit is at inside of a side of the display panel corresponding to (parallel and close to) the side of the back plate unit, so as to form an overlapping splicing area at the back of the display panel and near an edge of the display panel, and the overlapping splicing area is for splicing with a bezel area on a front of another display panel by overlapping.

Alternatively, the overlapping splicing area, where signal transmission lines are exposed, is covered with an insulating shield for protecting the signal transmission lines.

Alternatively, the display module further includes a curvature adjusting structure on the back of the display panel and connected to the angle adjusting structure, for adjusting a curvature of a display surface of the display panel.

The present disclosure has the following beneficial effects:

The overlapping spliceable display apparatus provided in this embodiment adjusts the angle of the display surface of the display module in the first plane perpendicular to the display surface by means of the angle adjusting structure, and adjusts the positions of the display module in the first direction, the second direction and the third direction by means of the position adjusting structure, which can not only make the display modules closer after being overlappingly spliced together, but also improve the convenience and safety of overlapping splicing. In addition, the overlapping spliceable display apparatus provided in this embodiment is applicable to the display modules of flat display and curved display.

DETAIL DESCRIPTION OF EMBODIMENTS

The present disclosure is described in detail below, and examples of embodiments of the present disclosure are illustrated in the accompanying drawings, wherein same or similar reference numerals refer to same or similar elements or elements with a same or similar function throughout. In addition, a detailed description of the prior art is omitted if it is unnecessary for the illustrated features of the present disclosure. The embodiments described below with reference to the accompanying drawings are exemplary and are only for explaining the present disclosure, but are not construed as limiting the present disclosure.

It will be understood by one of ordinary skill in the art that, unless otherwise defined, all terms (including technical and scientific terms) used herein have a same meaning as commonly understood by one of ordinary skill in the art to which the present disclosure belongs. It will be further understood that terms, such as those defined in commonly used dictionaries, should be interpreted as having a meaning that is consistent with their meaning in the context of the prior art and will not be interpreted in an idealized or overly formal sense unless specifically defined as herein.

It will be understood by one of ordinary skill in the art that the singular forms "a", "an" and "the" as used herein are intended to include the plural forms as well, unless expressly stated otherwise. It will be understood that when an element is referred to as being "connected" or "coupled" to another element, it may be directly connected or coupled to the other element or intervening elements may also be present. Further, "connected" or "coupled" as used herein may include wirelessly connected or wirelessly coupled. As used herein, the term "and/or" includes all or any element and all combinations of one or more of the associated listed items.

The technical solution of the present disclosure and how the technical solution of the present disclosure solves the above-described technical problems will be described in detail below by specific embodiments with reference to the accompanying drawings.

An overlapping spliceable display apparatus provided in an embodiment of the present disclosure is used to realize an overlapping splicing between display modules by adjusting an angle of a display surface of each of the display modules and a position of the display module in a three-dimensional space, and the spliceable display device is applicable to the display modules of flat display and curved display.

Figure 1:
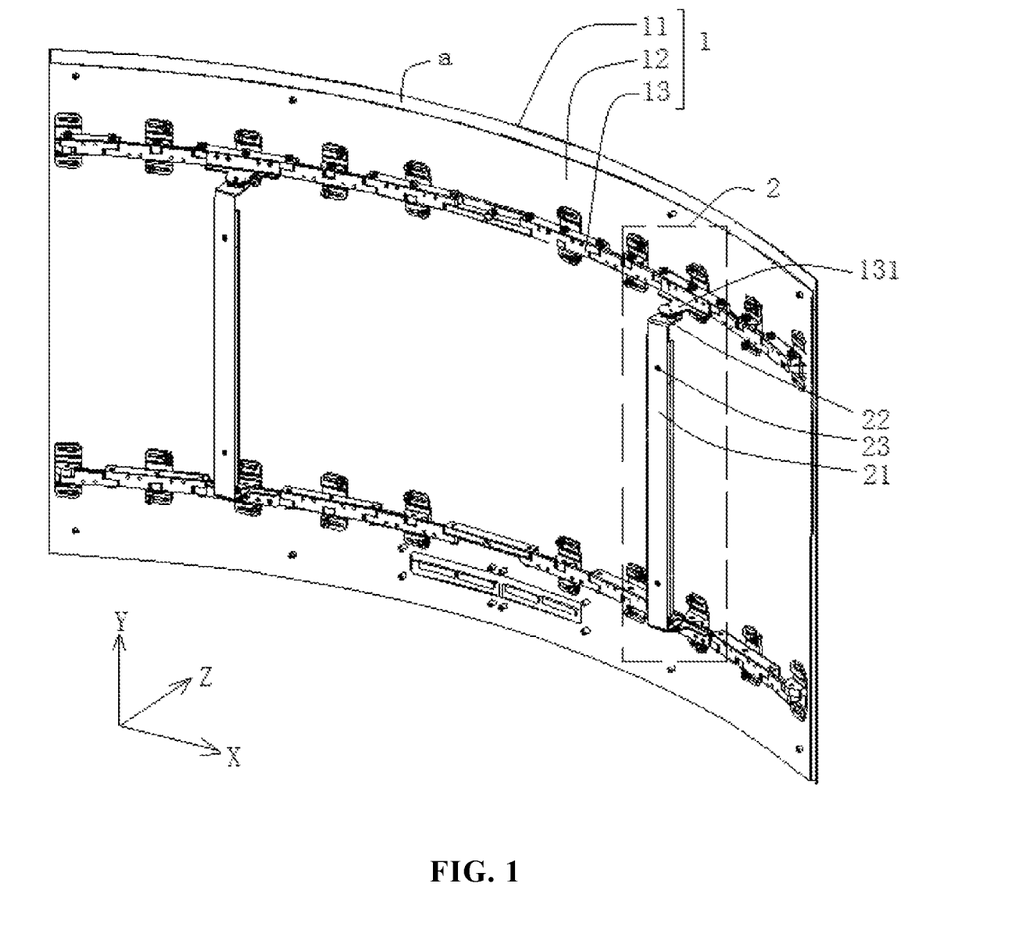
FIG. 1 is a rear view of a spliceable display apparatus (without a position adjusting structure) provided in an embodiment of the present disclosure.

Specifically, please refer to FIG. 1, in the embodiment shown in the figure, the display module 1 adopts an LCD display unit or an OLED display unit, the display module 1 includes a display panel 11 and a back plate unit 12 disposed on the back of the display panel 11, at least one side of the back plate unit 12 is located at inside of a side of the display panel 11 corresponding to (parallel and close to) the at least one side of the back plate unit 12, so as to form an overlapping splicing area a at the back of the display panel 11 and near an edge of the display panel 11. The overlapping splicing area a is used for a display panel of another display module that is spliced with this display module 1 to abut and match in the overlapping splicing area a, and abut against the side of the back plate unit 12. For example, on the back of the display panel 11 in FIG. 1, an upper side and a right side each are provided with the overlapping splicing area a.

In this embodiment, a curvature of the display surface of the display module 1 is adjustable, for example, the display surface may be changed from a curved display to a flat display, or may be changed between different curvatures. By adjusting the curvature of the display module 1, the display module 1 can be spliced with another display module of curved display by overlapping. A curvature adjusting structure for adjusting the curvature of the display surface may be various, for example, as shown in FIG. 1, the curvature adjusting structure 13 is provided on the back of the back panel unit 12, which is, for example, an adjusting hinge structure. Alternatively, in practical applications, other configurations that enable curvature adjustment may be used.

The spliceable display apparatus provided in the embodiment of the present disclosure is described in detail below by taking a display module of curved display as an example. Specifically, the spliceable display apparatus includes a fixing assembly arranged on the back of the back plate unit 12, the fixing assembly includes an angle adjusting structure 2, which is used for adjusting an angle of the display panel 11 of the display module 1 in a first plane, namely, rotating the display module 1 by a certain angle around a rotation axis perpendicular to the first plane. The first plane and the display surface of the display module 1 are perpendicular to each other. As shown in FIG. 1, the first plane and a plane of the X direction and the Z direction are parallel to each other, the display surface of the display module 1 and a plane of the X direction and the Z direction are perpendicular to each other, i.e. the display surface of the display module 1 and the first plane are perpendicular to each other. Where the spliceable display apparatus fixes the display module 1 in a hanging manner, the first plane and a horizontal plane are parallel to each other, and in this case, the display surface of the display module 1 and the horizontal plane are perpendicular to each other. Here, "perpendicular to each other" is not an absolute 90 degrees, as long as the display module 1 is bendable in the XZ plane shown in the figure.

Figure 2:
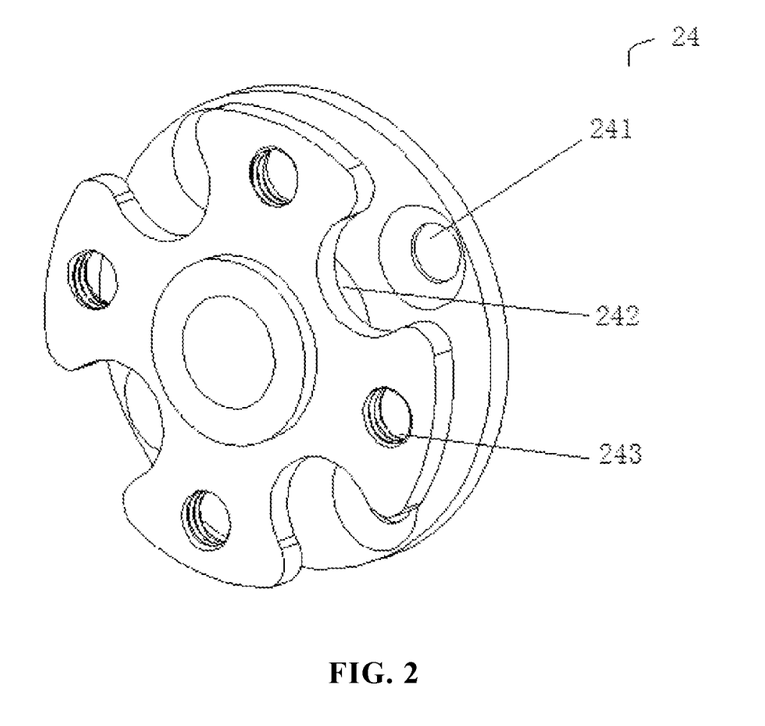
FIG. 2 is a schematic diagram illustrating a structure of a rotary damper provided in an embodiment of the present disclosure.

The angle adjusting structure 2 may be various, for example, in this embodiment, as shown in FIGS. 1 and 2, the angle adjusting structure 2 includes a first fixing member 21 and a rotating member 24, wherein the first fixing member 21 is connected to a position adjusting structure (not shown). In this embodiment, the first fixing member 21 includes a strip-shaped vertical hanging plate, and a length direction of the strip-shaped vertical hanging plate is perpendicular to the first plane (i.e., the plane parallel to the X direction and the Z direction). Since the strip-shaped vertical hanging plate is in a shape of flat-plate, even the display module 1 is of curved display, a plane connection may be realized, which brings convenience for the installation of the display module 1 and improves the installation stability, and further may be applicable to the display module of either flat display or curved display. Alternatively, in practical applications, other planar structures may be used as the connecting structure for the hanging display module 1.

The rotating member 24 is connected to the first fixing member 21 and the display module 1, and the rotating member 24 is configured to rotate the display module 1 relative to the first fixed member 21 about a rotation axis perpendicular to the first plane, i.e., parallel to the Y direction. By means of the rotating member 24, the angle of the display surface of the display module 1 in the first plane may be adjusted. The rotating member 24 may have various structures, as shown in FIG. 2, the rotating member 24 includes at least one first rotary damper for fixing the display module 1 at any angle in a first plane, that is, when a torque is applied to the first rotary damper, the first fixing member 21 and the display module 1 rotate relative to each other, and when the torque is released, the first fixing member 21 and the display module 1 are kept stationary at the current angle.

There are various specific manners for connecting the rotating member 24 to the first fixing member 21 and the display module 1, for example, as shown in FIG. 1, first parallel connecting plates 22 are provided at both ends of the strip-shaped vertical hanging plate, respectively, and second parallel connecting plates 131 are provided at the back of the display module 1 (for example, the curvature adjusting apparatus 13), the first parallel connecting plate 22 and the second parallel connecting plate 131 are arranged opposite to each other and are both parallel to the first plane, that is, parallel to the plane of the X direction and the Z direction. Further, the rotating member 24 (not shown in FIG. 1) is connected between the first parallel connecting plate 22 and the second parallel connecting plate 131. As shown in FIG. 2, the first rotary damper includes a first adapter 241, a second adapter 243 and a rotary damper 242 connected between the first adapter 241 and the second adapter 243, wherein the first adapter 241 and the second adapter 243 are fixedly connected to the first parallel connecting plate 22 and the second parallel connecting plate 131, respectively.

In some embodiments, in order to improve structural stability, a plurality of first fixing members 21 may be provided, and the plurality of first fixing members 21 are symmetrically distributed with respect to the back of the display module 1, for example, there are two first fixing members 21 in FIG. 1. The number of the rotating members 24 is the same as that of the first fixing members 21, and a respective rotating member 24 is connected to a respective first fixing member 21 in a one-to-one correspondence manner (each of the rotating members 24 is connected to one of the first fixing members 21, and each of the first fixing members 21 is connected to one of the rotating members 24). For example, in FIG. 1, each first fixing member 21 is a strip-shaped vertical hanging plate, and correspondingly, the rotating member 24 includes two first rotary dampers, and the two first rotary dampers are arranged at both ends of the strip-shaped vertical hanging plate, respectively, and rotation axes of the two first rotary dampers coincide with each other.

Figure 3:
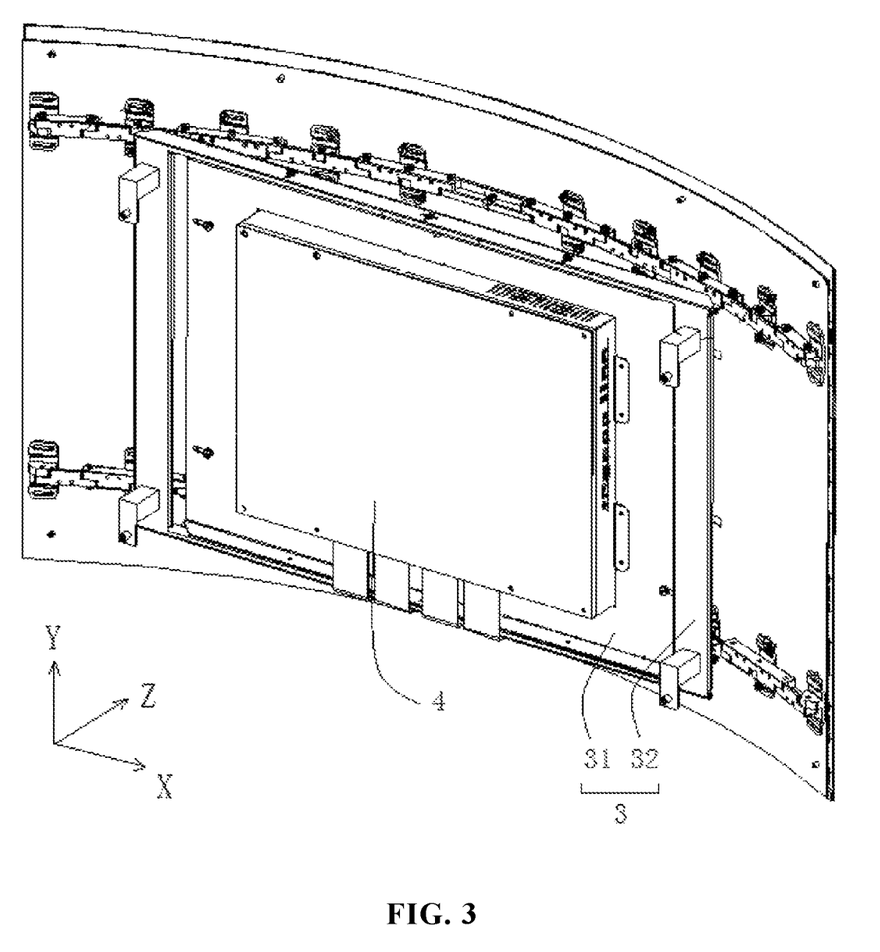
FIG. 3 is a rear view of a spliceable display apparatus (not mounted to a support) provided in an embodiment of the present disclosure.

FIG. 3 is a rear view of a spliceable display apparatus (not mounted to a support) provided in an embodiment of the present disclosure. As shown in FIG. 3, the spliceable display apparatus further includes a position adjusting structure 3 connected to the angle adjusting structure 2 and the support (not shown in FIG. 3) for adjusting a position of the display module 1 in a first direction (i.e., X direction), a second direction (i.e., Z direction) and a third direction (i.e., Y direction), wherein any two of the first direction (i.e., X direction), the second direction (i.e., Z direction) and the third direction (i.e., Y direction) are perpendicular to each other, the first direction (i.e., X direction) and the second direction (i.e., Z direction) are parallel to the first plane, and the third direction (i.e., Y direction) is perpendicular to the first plane. Adjusting the position of display module 1 in the first direction, the second direction and the third direction, with the position adjusting structure 3 not only make the display modules closer after being spliced together by overlapping, but also improve the convenience and safety of overlapping splicing.

Figure 4:
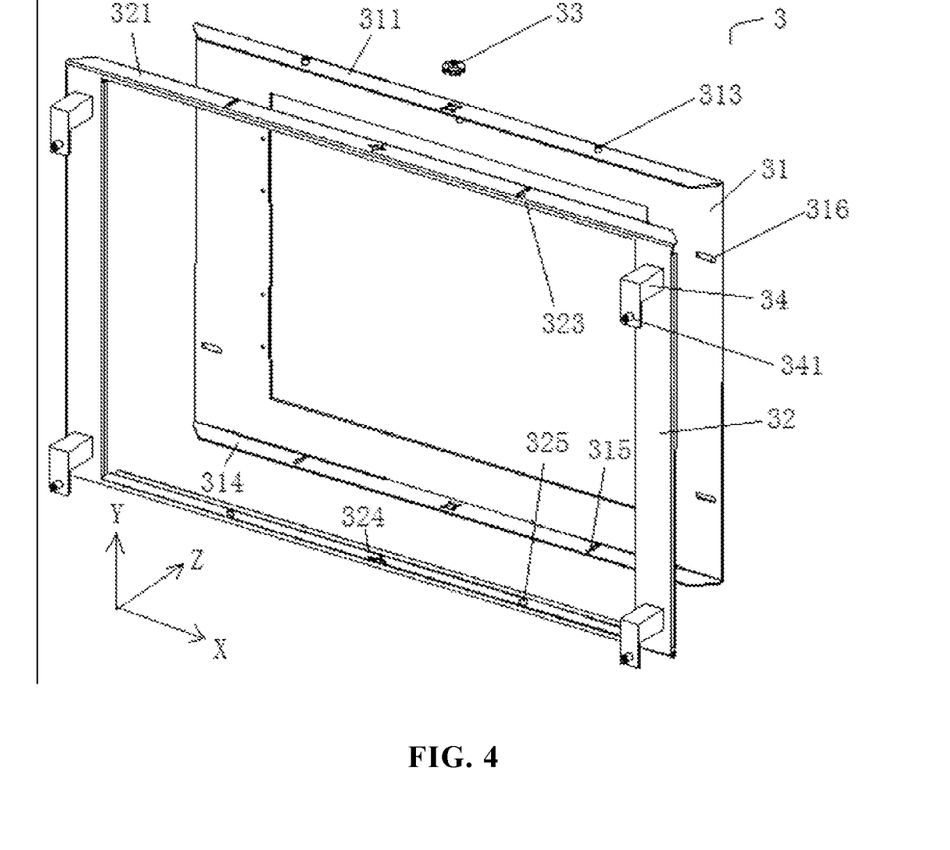
FIG. 4 is an exploded view of a position adjusting structure provided in an embodiment of the present disclosure.

The structure of the position adjusting structure 3 may be various, for example, the position adjusting structure 3 includes a second fixing member and a position adjusting component. As shown in FIGS. 3 and 4, the second fixing member includes, for example, a rectangular frame 32 and a fixing plate 31, wherein the fixing plate 31 is stacked on the rectangular frame 32 and is located on a side of the rectangular frame 32 close to the display module 1, the fixing plate 31 is connected to the rectangular frame 32 and the angle adjusting structure 2, and the fixing plate 31 is used for installing a system box 4.

In some embodiments, for convenience of installation, the spliceable display apparatus provided in the embodiments of the present disclosure further includes a parallel adjusting structure connected between the angle adjusting structure 2 and the position adjusting structure 3, for adjusting a relative position between the angle adjusting structure 2 and the position adjusting structure 3 in the first direction (i.e., X direction). For example, the parallel adjusting structure includes a strip-shaped hole 316 provided in the fixing plate 31 and an adjusting screw 23 provided in the first fixing member 21, wherein a length direction of the strip-shaped hole 316 is parallel to the first direction. The adjusting screw 23 may be fixed at different positions in the length direction of the strip-shaped hole 316, so that the relative position between the fixing plate 31 and the first fixing member 21 in the first direction (i.e., X direction) may be adjusted.

Figure 5:
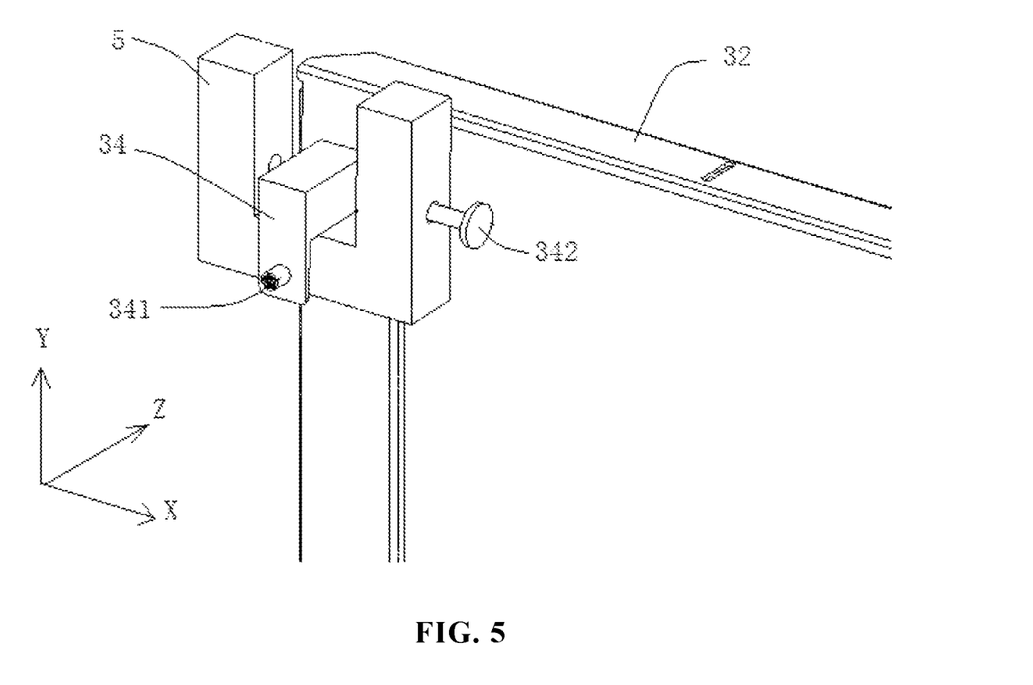
FIG. 5 is a diagram illustrating a partial structure of a position adjusting structure provided in an embodiment of the present disclosure.

As shown in FIG. 5, the rectangular frame 32 is provided with a first connecting member 34, and the support is provided with a second connecting member 5, the first connecting member 34 is connected to the second connecting member 5 in a hanging manner, so that the rectangular frame 32 and the display module 1 connected therewith are integrally hung. Specifically, as shown in FIG. 4, four first connecting members 34 are provided at four corners of the rectangular frame 32, respectively, and correspondingly, four second connecting members 5 are provided on the support (not shown in the figure), and a respective first connecting member 34 is connected to a respective second connecting member 5 in a one-to-one correspondence manner (each of the first connecting members 34 is connected to one of the second connecting members 5, and each of the second connecting members 5 is connected to one of the first connecting members 34). By providing the four first connecting members 34 at the four corners of the rectangular frame 32, respectively, structural stability may be improved.

The position adjusting component is used for adjusting the relative position between the first connecting member 34 and the second connecting member 5 in the first direction, the second direction and the third direction, thereby the position of the display module 1 in the first direction, the second direction and the third direction may be adjusted, which can not only make the display modules closer after being overlappingly spliced together, but also improve the convenience and safety of overlapping splicing. Four position adjusting components are provided corresponding to the four first connecting members 34, and a respective position adjusting component is used for adjusting the relative position between a respective first connecting member 34 and the corresponding second connecting member 5 (attached to the respective first connecting member 34) in the first direction, the second direction and the third direction in a one-to-one correspondence (each of the position adjusting components is for adjusting relative positions between one of the first connecting members 34 and the second connecting member 5 attached to this first connecting member 34 in the first direction, the second direction and the third direction; and relative positions between each of the first connecting members 5 and the second connecting member 34 attached to this first connecting member 5 in the first direction, the second direction and the third direction, are adjusted by one of the position adjusting components).

The structure of the position adjusting component may be various, for example, the position adjusting component includes three adjusting screws having axes parallel to the first direction, the second direction, and the third direction, respectively. As shown in FIG. 5, an adjusting screw 342 having an axis parallel to the first direction (i.e., X direction) and an adjusting screw 341 having an axis parallel to the second direction (i.e., Z direction) are illustrated, and the adjusting screw having an axis parallel to the third direction (i.e., Y direction) is located at the bottom of the second connecting member 5 (not shown in FIG. 5). At least one screw hole is provided in the second connecting member 5, the screw hole is parallel to the first direction (i.e., X direction), and the adjusting screw 342 is matched with the screw hole and may abut against a surface of the first connecting member 34 opposite to the adjusting screw 342. Since the support and the second connecting member 5 of the support are always fixed, the first connecting member 34 may be pushed to move in the first direction relative to the second connecting member 5 by rotating the adjusting screw 342 clockwise or counterclockwise. As shown in FIG. 5, two screw holes are respectively provided at both sides of the first connecting member 34, and each screw hole is provided with the adjusting screw 342, so that the first connecting member 34 may move left or right in the first direction. Similarly, a threaded hole is provided in the first connecting member 34, the adjusting screw 341 is matched with the threaded hole, and may abut against a surface of the second connecting member 5 opposite to the first connecting member 34.

It should be noted that, in practical applications, the first connecting member 34 and the second connecting member 5 may alternatively adopt any other structures, and the connection manners between the two are different according to the different structures. The adjusting screw may be in threaded connection with one of the first connecting member 34 and the second connecting member 5 and abut against the other one of the first connecting member and the second connecting member, as long as the relative position between the first connecting member 34 and the second connecting member 5 may be adjusted.

In some embodiments, as shown in FIG. 4, first parallel flangings, i.e., two first parallel flangings (321, 324), are provided at upper and lower ends of the rectangular frame 32, respectively. Second parallel flangings, i.e., two second parallel flangings (311, 314), are provided at upper and lower ends of the fixing plate 31, respectively. The first and second parallel flangings are parallel to the first plane. Each first parallel flanging is opposite to a corresponding second parallel flanging (parallel to the first parallel flanging), namely, the first parallel flanging 321 is opposite to the second parallel flanging 311; the first parallel flanging 324 is opposite to the second parallel flanging 314. A second rotary damper 33 is provided between each first parallel flanging and the corresponding second parallel flanging for rotating the fixing member 31 about a rotation axis perpendicular to the first plane, so that the angle of the fixing member 31 in the first plane may be finely adjusted, thereby facilitating installation.

In some embodiments, after finely adjusting the angle of the fixing member 31 in the first plane using the above-described second rotary damper 33, in order to lock the relative angle between the fixing member 31 and the rectangular frame 32, a first fastening member 313 is provided in the second parallel flanging 311 located at the upper end of the fixing member 31, and a second fastening member 325 is correspondingly provided in the first parallel flanging 324 located at the lower end of the rectangular frame 32. A first arc-shaped hole 323 centering on the rotation axis of the second rotary damper 33 is provided in the first parallel flanging 321 located at the upper end of the rectangular frame 31, and a second arc-shaped hole 315 centering on the rotation axis of the second rotary damper 33 is correspondingly provided in the second parallel flanging 314 located at the lower end of the fixing member 31. The relative angle between the fixing member 31 and the rectangular frame 32 is locked by fixedly connecting the first fastening member 313 to the first arc-shaped hole 323 at different positions and fixedly connecting the second fastening member 325 to the second arc-shaped hole 315 at different positions. In addition, the above-described first fastening member 313 and the second fastening member 325 are each disposed outside the respective flangins for convenience of installation.

Figure 6:
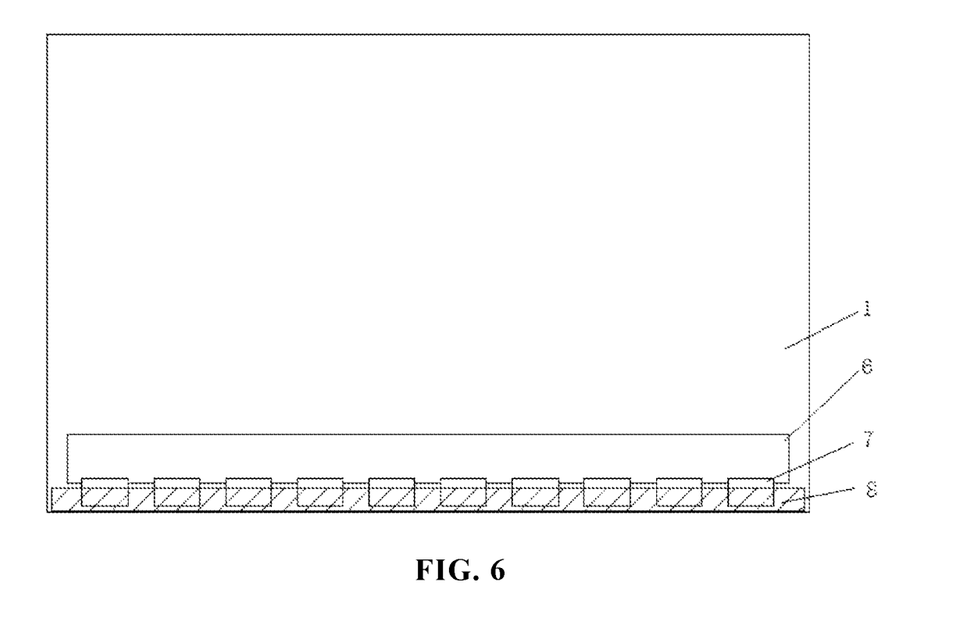
FIG. 6 is a schematic diagram illustrating a structure of an overlapping splicing area of a display module with signal transmission lines exposed.

In some embodiments, as shown in FIG. 6, in the display module 1, at least one side of the display panel is provided with a signal plate 6, and signal transmission lines 7 of the display panel need to be exposed so as to be connected to the signal plate 6, in this case, the overlapping splicing area where the signal transmission lines 7 are exposed is alternatively covered with an insulating shield 8 for protecting the signal transmission lines 7. Thus, all sides of the display module 1 may be used for splicing with any other display module by overlapping.

Figure 7:
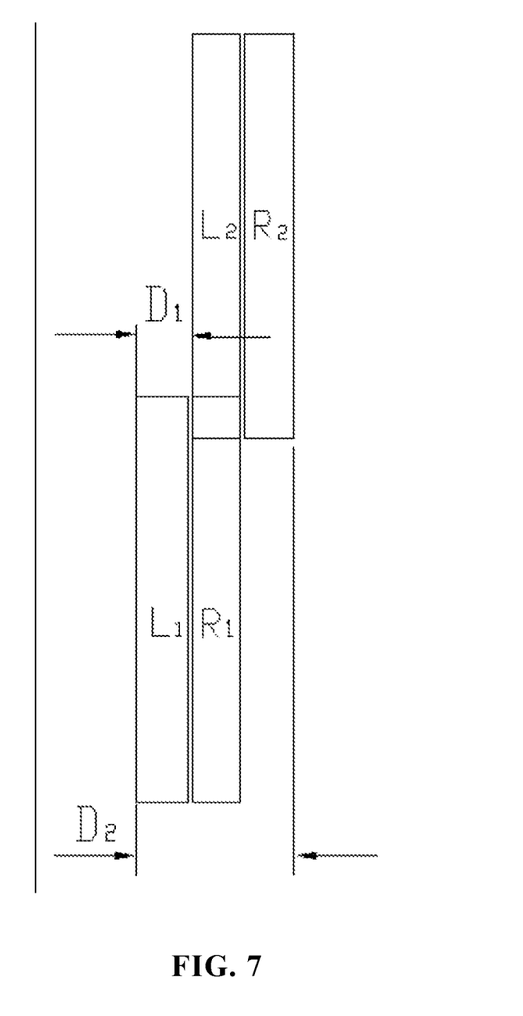
FIG. 7 is a schematic side view illustrating an overlapping splicing between conventional display modules.
Figure 8:
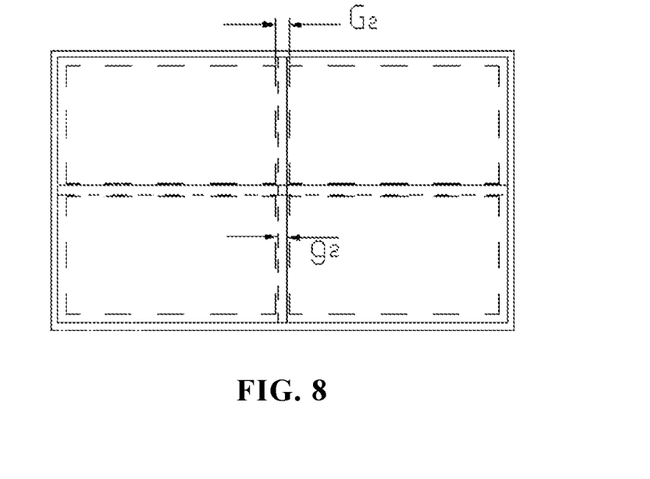
FIG. 8 is a schematic plan view illustrating an overlapping splicing between display modules provided in an embodiment of the present disclosure.

In the prior art, as shown in FIGS. 7 and 8, for a conventional display module, a thickness of the conventional display module is relatively large (the thickness is generally greater than 1 mm), and if such display modules are spliced by overlapping each other, a relatively large screen drop will occur during displaying. As shown in FIG. 7, when four display modules L1, L2, R1 and R2 are spliced by overlapping, R1 and L2 are spliced by overlapping on the rear side of L1, and R2 is spliced by overlapping on the rear side of L2. Assuming that the thickness of each display module 1 is D1, the four display modules L1, L2, R1 and R2 are spliced by overlapping to form a display drop of D2, and D2 is equal to the sum of two times of D1 and an assembly gap, and the drop is continuously accumulated as the number of the spliced display modules increases. Therefore, only display modules with smaller thickness may be adopted, for example, OLED display modules (a thickness is less than 1 mm) are spliced together by overlapping to reduce a seam between every two display modules. For example, as shown in FIGS. 8 and 9, the bezel portions of two display modules are overlapped and shielded, a width of the overlapped portion g2 is equal to a bezel width of one display module, and after the two display modules are spliced by overlapping, a gap between the two display modules is G2.

Figure 9:
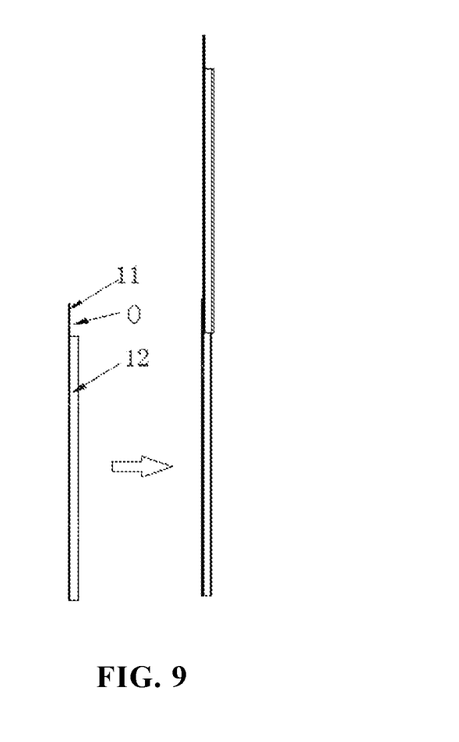
FIG. 9 is a schematic side view illustrating an overlapping splicing between display modules provided in an embodiment of the present disclosure.

As shown in FIG. 9, as may be seen from the left of the figure, at least one side of the back plate unit 12 is located at inside of a side of the display panel 11 corresponding to (parallel and close to) the at least one side of the back plate unit 12, so as to form an overlapping splicing area a at the back of and near an edge of the display panel 11. The overlapping splicing area a is used for splicing with a bezel area on the front of another display panel 11 by overlapping. As may be known from the right of the figure, through providing the above-described overlapping splicing area a, the drop effect between the display modules after overlapping splicing may be ignored.

Figure 10:
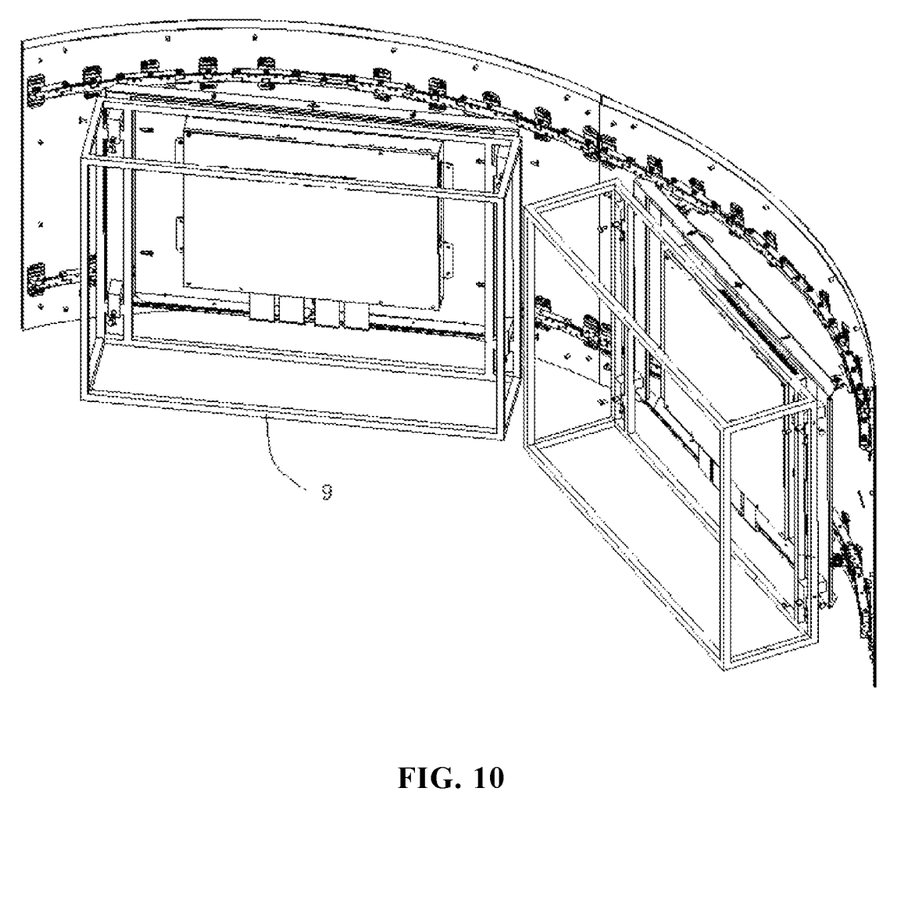
FIG. 10 is a rear view of two display modules after being spliced by overlapping provided in an embodiment of the present application.

FIG. 10 is a rear view of two display modules after being spliced by overlapping provided in an embodiment of the present disclosure. As shown in FIG. 10, two display modules are fixed on two supports 9, respectively, and utilize a respective overlapping spliceable display apparatus to adjust corresponding angle and position, thereby realizing the overlapping splicing.

To sum up, the overlapping spliceable display apparatus provided in an embodiment of the present disclosure adjusts the angle of display surface of display module 1 in the first plane through utilizing angle adjusting structure 2, and adjusts the position of display module 1 in the first direction, the second direction and the third direction through utilizing position adjusting structure 3, which can not only make the display modules closer after being overlappingly spliced together, but also improve the convenience and safety of overlapping splicing. In addition, the overlapping spliceable display apparatus provided in this embodiment is applicable to the display modules of flat display and curved display.

One of ordinary skill in the art will understand that various operations, methods, steps in the flow, measures, schemes discussed in the present disclosure may be alternated, modified, combined, or deleted.

In the description of the present disclosure, it is to be understood that an orientation or a positional relationship indicated by the term "center", "upper", "lower", "front", "rear", "left", "right", "vertical", "horizontal", "top", "bottom", "inner", "outer", or the like is an orientation or a positional relationship based on those shown in the drawings, merely for convenience of describing the present disclosure and simplifying the description, but does not indicate or imply that the apparatus or element referred to must have a particular orientation, be constructed and operated in a particular orientation, and therefore should not be construed as limiting the present disclosure.

The above are only a part of embodiments of the present disclosure. It should be noted that one of ordinary skill in the art may make various improvements and modifications without departing from the principle of the present disclosure, and these improvements and modifications should also be considered as within the protection scope of the present disclosure.

What is claimed is:

1. An overlapping spliceable display apparatus, comprising a display module, wherein the display module comprises a display panel and a back plate unit on a back of the display panel, at least one side of the back plate unit is at an inside of a side of the display panel corresponding to the side of the back plate unit, so as to form an overlapping splicing area at the back of the display panel near an edge of the display panel, and the overlapping splicing area is for splicing with a bezel area on a front of another display panel by overlapping, wherein the overlapping spliceable display apparatus further comprises a fixing assembly on a back of the display module, for fixing the display module to a support;

wherein the fixing assembly comprises an angle adjusting structure which is connected to the display module, for adjusting an angle of a display surface of the display module in a first plane perpendicular to the display surface; and the angle adjusting structure comprises: a first fixing member connected to a position adjusting structure; and a rotating member, which is connected to the first fixing member and the display module, and configured to enable the display module to rotate relative to the first fixing member around a rotation axis perpendicular to the first plane.

2. The overlapping spliceable display apparatus according to claim 1, wherein the first fixing member comprises a strip-shaped vertical hanging plate, a length direction of the strip-shaped vertical hanging plate and the first plane are perpendicular to each other;

both ends of the strip-shaped vertical hanging plate are provided with a first parallel connecting plate, respectively, a second parallel connecting plate is provided on the back of the display module, the first parallel connecting plate and the second parallel connecting plate are arranged opposite to each other and are each parallel to the first plane, and the rotating member is connected between the first parallel connecting plate and the second parallel connecting plate.

3. The overlapping spliceable display apparatus according to claim 2, comprising a plurality of the first fixing members, wherein the plurality of the first fixing members are symmetrically distributed with respect to the back of the display module; the number of the rotating members is the same as that of the first fixing members, and the rotating members are connected to the first fixing members in a one-to-one correspondence.

4. The overlapping spliceable display apparatus according to claim 2, wherein the rotating member comprises a first rotary damper for fixing the display module in the first plane at any angle.

5. The overlapping spliceable display apparatus according to claim 1, comprising a plurality of the first fixing members, wherein the plurality of the first fixing members are symmetrically distributed with respect to the back of the display module; the number of the rotating members is the same as that of the first fixing members, and the rotating members are connected to the first fixing members in a one-to-one correspondence.

6. The overlapping spliceable display apparatus according to claim 1, wherein the rotating member comprises a first rotary damper for fixing the display module in the first plane at any angle.

7. The overlapping spliceable display apparatus according to claim 1, wherein the fixing assembly comprises the position adjusting structure; the position adjusting structure is connected to the angle adjusting structure and the support, for adjusting a position of the display module in a first direction, a second direction and a third direction, wherein any two of the first direction, the second direction and the third direction are perpendicular to each other, the first direction and the second direction are each parallel to the first plane, and the third direction is perpendicular to the first plane;

the position adjusting structure comprises: a second fixing member, which is connected to the angle adjusting structure, wherein the second fixing member is provided with a first connecting member, the support is provided with a second connecting member, and the first connecting member is connected to the second connecting member in a hanging mode; and a position adjusting component for adjusting a relative position between the first connecting member and the second connecting member in the first direction, the second direction and the third direction.

8. The overlapping spliceable display apparatus according to claim 7, wherein the position adjusting component comprises three adjusting screws having axes parallel to the first direction, the second direction and the third direction, respectively, each of the three adjusting screws is in threaded connection with one of the first connecting member and the second connecting member and abuts against the other of the first connecting member and the second connecting member, so as to adjust a relative position between the first connecting member and the second connecting member by rotating the adjusting screw clockwise or counterclockwise.

9. The overlapping spliceable display apparatus according to claim 7, wherein the second fixing member comprises:

a rectangular frame, wherein four of the first connecting members are provided at four corners of the rectangular frame, respectively, the support is correspondingly provided with four of the second connecting members, and the first connecting members are connected to the second connecting members in a one-to-one correspondence; the number of the position adjusting components is four, and the position adjusting components are, in a one-to-one correspondence, for adjusting relative positions between the first connecting members and the second connecting members corresponding to the first connecting members in the first direction, the second direction and the third direction; and a fixing plate, which is stacked on the rectangular frame and on a side of the rectangular frame close to the display module, wherein the fixing plate is connected to the rectangular frame and the angle adjusting structure, and for installing a system box.

10. The overlapping spliceable display apparatus according to claim 9, wherein first parallel flangings are provided at upper and lower ends of the rectangular frame, respectively, and second parallel flangings are provided at upper and lower ends of the fixing plate, respectively, the first parallel flangings and the second parallel flangings are each parallel to the first plane; and each of the first parallel flangings is opposite to the second parallel flanging corresponding to the first parallel flanging, and a second rotary damper is between the first parallel flanging and the second parallel flanging to enable the fixing member to rotate around a rotation axis perpendicular to the first plane.

11. The overlapping spliceable display apparatus according to claim 10, wherein a first fastening member is in the second parallel flanging at the upper end of the fixing plate, and a second fastening member is correspondingly in the first parallel flanging at the lower end of the rectangular frame;

a first arc-shaped hole centering on the rotation axis is in the first parallel flanging at the upper end of the rectangular frame, and a second arc-shaped hole centering on the rotation axis is correspondingly in the second parallel flanging at the lower end of the fixing plate; and a relative angle between the fixing member and the rectangular frame is locked by fixedly connecting the first fastening member to the first arc-shaped hole at different positions and fixedly connecting the second fastening member to the second arc-shaped hole at different positions.

12. The overlapping spliceable display apparatus according to claim 7, wherein a parallel adjusting structure is between the angle adjusting structure and the position adjusting structure, for adjusting a relative position between the angle adjusting structure and the position adjusting structure in the first direction.

13. The overlapping spliceable display apparatus according to claim 1, wherein the overlapping splicing area, where signal transmission lines are exposed, is covered with an insulating shield for protecting the signal transmission lines.

14. The overlapping spliceable display apparatus according to claim 1, wherein the display module further comprises a curvature adjusting structure on the back of the display panel and connected to the angle adjusting structure, for adjusting a curvature of a display surface of the display panel.

* * * * *